United States Patent
Robertson et al.

(10) Patent No.: US 6,510,225 B1
(45) Date of Patent: Jan. 21, 2003

(54) ULTRASONICALLY-CALIBRATED FAST-START ECHO CANCELLER FOR CELLULAR AND PCS TELEPHONE CAR KITS

(75) Inventors: Dan Robertson, Carlsbad, CA (US); Lowell Campbell, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/250,973

(22) Filed: Feb. 16, 1999

(51) Int. Cl.[7] .............................................. H04M 1/76
(52) U.S. Cl. ................................ 379/406.1; 379/406.01
(58) Field of Search ..................... 379/406.01, 406.08, 379/406.1; 375/231, 232; 381/71.8, 71.9

(56) References Cited

U.S. PATENT DOCUMENTS

| | | | |
|---|---|---|---|
| 5,022,082 A | * 6/1991 | Eriksson et al. | 381/71.8 |
| 5,050,160 A | * 9/1991 | Fuda | 379/406.1 |
| 5,668,794 A | * 9/1997 | McCaslin et al. | 379/406.07 |

* cited by examiner

*Primary Examiner*—Forester W. Isen
*Assistant Examiner*—Jefferey Harold
(74) *Attorney, Agent, or Firm*—Harness, Dickey & Pierce, PLC

(57) ABSTRACT

The present disclosure describes an ultrasonically-calibrated fast-start adaptive echo canceller system. The system consists of at least one ultrasonic transducer for transmitting ultrasound signal and at least one ultrasonic receiver for receiving reflected ultrasound echo. The system also includes an echo pulse counter that operates constantly when the phone is on. The counter processes the reflected ultrasound echo from the ultrasonic receiver to determine optimum sets of ultrasonic delay and attenuation coefficients. A fast-start adaptive controller adaptively controls an algorithm stored in a random access memory to correlate sets of audio-frequency coefficients for transversal filter with predetermined sets of ultrasonic coefficients by using an ultrasound to audio-frequency conversion table. The resultant sets of audio-frequency coefficients are held on a stack.

12 Claims, 5 Drawing Sheets

ULTRASONICALLY-CALIBRATED FAST-START ECHO CANCELLER FOR CELLULAR AND PCS TELEPHONE CAR KITS

TECHNICAL FIELD

The present specification generally relates to communication devices. More particularly, the present specification describes ultrasonically-calibrated fast-start adaptive echo canceller system.

BACKGROUND

Echoes are present in most conversations conducted indoors. The actual echoes within a room or car are typically on the order of about a microsecond. The so-called "cyclo-acoustic effect" governs how this echo is perceived. If the delay between the speech and the echo is less than a few tens of milliseconds, the echo is not very noticeable but perceived as a form of spectral distortion or reverberation. For longer delays, on the order of about 100 milliseconds, the echo becomes more noticeable.

Echoes may be experienced on a telephone circuit. Every telephone in a given area is connected to a central office by a channel that serves the need for communications in both directions. Accordingly, there has to be provision for connecting the two-wire circuit to the four-wire circuit. This connection is accomplished by means of a hybrid transformer.

When a speech signal encounters an impedance mismatch at any point on a telephone circuit, such as at a hybrid transformer, a portion of that signal may reflect as an echo. In mobile communication systems, vocoder delays and convolution coding algorithms may introduce additional delay. The round trip signal delays can be on the order of 100 milliseconds, for example.

Another type of echo is an acoustic echo. The signal transmitted from a speaker is reflected from nearby objects and is picked up by a microphone. This type of echo commonly occurs when a caller is using a speakerphone in a vehicle where the speaker and microphone are both in a relatively small and enclosed space.

The echoes can be canceled using adaptive echo cancellers. The basic principle is to synthesize a replica of the echo and subtract it from the returned signal. For the adaptive echo cancellation circuit to operate satisfactorily, the impulse response of the adaptive filter should have a length greater than the longest echo delay that needs to be accommodated.

Effective electronic echo cancellers require a training interval at the start of each call to determine delay and attenuation coefficients corresponding to the time variant acoustic echo configuration. During this training interval the echo cancellation is not effective.

With sampling rate for a speech signal conservatively chosen as 8 kHz, the length of the adaptive filter would have to be 512 or greater to accommodate echo delays between 50 and 100 milliseconds. Therefore, it can take a considerable amount of time to train and adapt such a large number of delay and attenuation coefficients for an adaptive echo cancelling synthesizer. This means that a caller could wait as much as two to three seconds after a call is initiated before the optimum set of coefficients is adapted and applied.

SUMMARY

The present disclosure describes an ultrasonically-calibrated fast-start adaptive echo canceller system. The system has at least one cellular transceiver; at least one speaker for converting the input signal to audible sound; and at least one microphone for picking up a desired voice signal. The microphone also picks up an echo of the input signal resulting in a combined desired and undesired signal. The ultrasonic portion includes at least one ultrasonic transceiver for transmitting and receiving an ultrasound signal.

The echo canceller system also includes an adaptive echo cancelling synthesizer that has, for example, "stages" of adjustable time delays, gain amplifiers and adders configured to synthesize a replica of the echo of the input signal. In a preferred embodiment, the echo cancelling synthesizer is a transversal filter. The replica of the echo is synthesized by taking the input signal and successively time-delaying, amplifying and adding to the previously-calculated value.

The output of the adaptive echo cancelling synthesizer is then subtracted from the combined signal picked up by the microphone. An error signal is generated by this subtraction.

The echo canceller system also includes a selection element that receives inputs from the error signal and the input signal. The selection element has a selection controller and a memory.

An echo pulse counter analyzes recorded time delays of the ultrasound echo signal. The time delays are recorded when the amplitude of the ultrasound echo signal exceeds certain pre-specified thresholds. The ultrasonic echo pulse counter operates prior to call initiation and produces the set of ultrasonic coefficients based on the recorded time delays. This set is compared with previous sets of ultrasonic coefficients to find the closest match. The matched ultrasonic set is used to correlate an initial audio-frequency set of coefficients using a pre-determined conversion table.

The selection controller selects and applies an initial set of audio-frequency coefficients for a particular echo configuration from the audio-frequency sets in the memory.

In a further embodiment, the echo canceller system includes a system controller that monitors call initiations and terminations and generates commands. The system controller commands a nonvolatile memory to load and store sets of coefficients corresponding to previously-obtained ultrasonic echoes.

The present disclosure further describes a method for quickly starting an echo canceller system. The method includes steps of recording time delays of an ultrasonic echo signal when the amplitude of the echo exceeds certain pre-specified thresholds; generating set of ultrasonic coefficients based on the recorded time delays; and comparing the current set of ultrasonic coefficients with previous sets to find the closest match.

Once the sets of ultrasonic coefficients are loaded into the memory, the selection controller correlates the matched set of ultrasonic coefficients with set of audio-frequency coefficients using a predetermined ultrasonic to audio-frequency conversion table. Then, the selection controller applies an initial set of audio-frequency coefficients from the audio-frequency sets in the memory. Finally, the selection element controller starts a normal adaption process of iteratively synthesizing an echo of an audio input signal and subtracting the synthesized echo from a combined signal of desired voice and audio input signal based on a previous difference.

The details of one or more embodiments are set forth in the accompanying drawings and the description below. Other embodiments and advantages will become apparent from the following description and drawings, and from the claims.

BRIEF DESCRIPTION OF THE DRAWINGS

Like reference numbers and designations in the various drawings indicate like elements.

DETAILED DESCRIPTION

A detailed description of a preferred embodiment of an ultrasonically-calibrated fast-start adaptive echo canceller employing an ultrasound to audio-frequency conversion table and a transversal filter is herein provided with respect to the figures.

Figure 1:
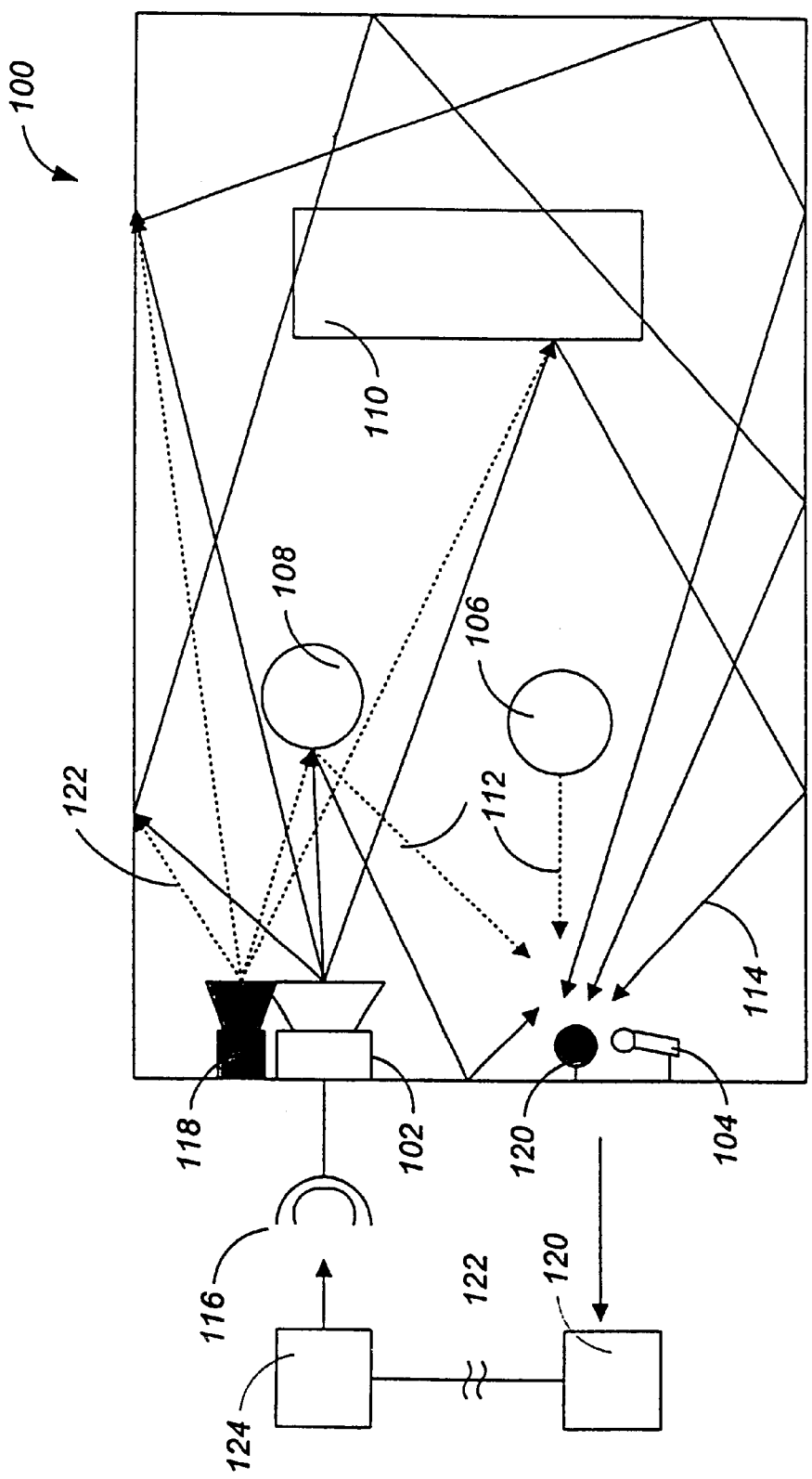
FIG. 1 is a block diagram of the problem posed by acoustic echo in hands-free speaker phone call in a vehicle.

FIG. 1 illustrates the problem posed by acoustic echo in hands-free speakerphone call in a vehicle cabin 100. The figure also illustrates the solution provided by the ultrasonic calibration. This particular echo configuration includes a driver 106, a passenger 108, and a cargo 110. The signal transmitted by CDMA transceiver processor 124 is picked up by an antenna 116 and is transmitted through the speaker 102. The signal emanating from the speaker 102 reflects off the walls and objects within the vehicle. The desired voice signal 112 from the driver and the passenger as well as the reflected echo signal 114 is picked up by the microphone 104. The information is processed by a CDMA processor 120, transmitted over a CDMA channel 122, and returned to CDMA transceiver processor 124. The round-trip takes approximately 100 to 300 milliseconds.

This echo is typically cancelled by an echo canceller system using an adaptively-operated transversal filter that cancels the echo based on adaptively determined coefficients.

The present system obtains start-up data for the echo canceller using an ultrasonic calibration system. An ultrasound signal 122 is produced near the speaker 102 prior to call initiation. An ultrasonic transducer 118 emits bursts of ultrasound signal 122 with a particular pulse repetition frequency. An ultrasonic receiver 120 picks up an echo of the ultrasound signal 122. The ultrasound signal 122 picked up by the receiver 120 can be processed into a set of ultrasonic indicative signals. Each set of these ultrasonic indicative signals are correlated with a set of predetermined audio-frequency coefficients determined through previous operations.

Figure 2:
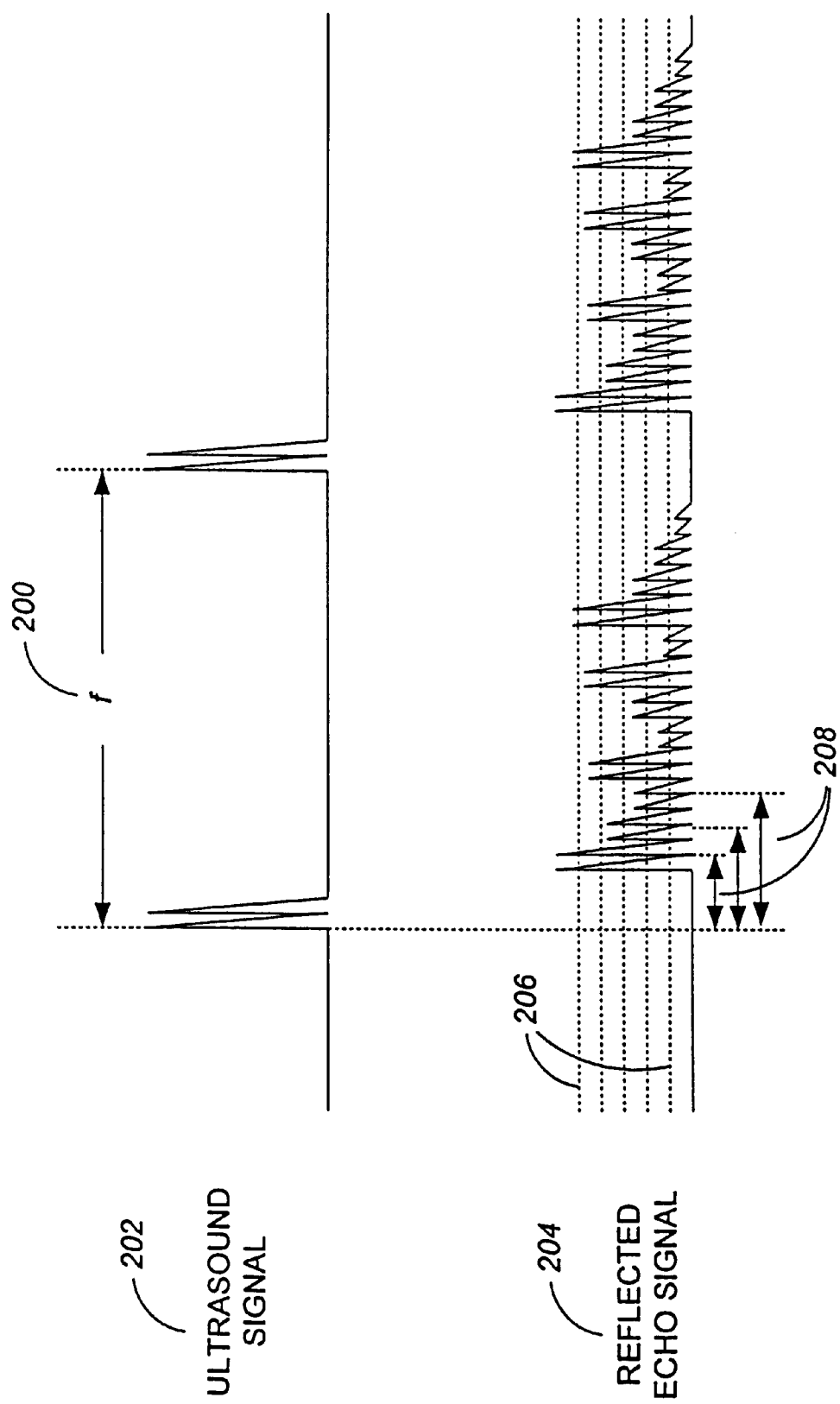
FIG. 2 is a timing diagram of the ultrasound signal and the reflected echo signal.

FIG. 2 shows a timing diagram of an ultrasound signal 202 and its reflected echo signal 204. An ultrasonic transducer 118 emits bursts of ultrasound signal 202 with a particular pulse repetition frequency 200 such that the period of the signal is longer than the longest echo reflected from the signal. The ultrasound signal 202 also has a low duty cycle so that an echo pulse counter can process the reflected echo signal 204 between the two signal bursts 202. This particular pulse repetition frequency 200 and duty cycle will avoid any ambiguity in the reflected echo signal 204 as to whether the echo is from the current or the previous burst of ultrasound signal 202. An echo pulse counter records the times 208 when the amplitude of the reflected signal 204 exceeds certain thresholds 206. Alternatively, the whole waveform could be recorded. This information will be used to determine a current set of ultrasonic delay and attenuation coefficients for a particular echo configuration within the vehicle cabin 100.

Figure 3:
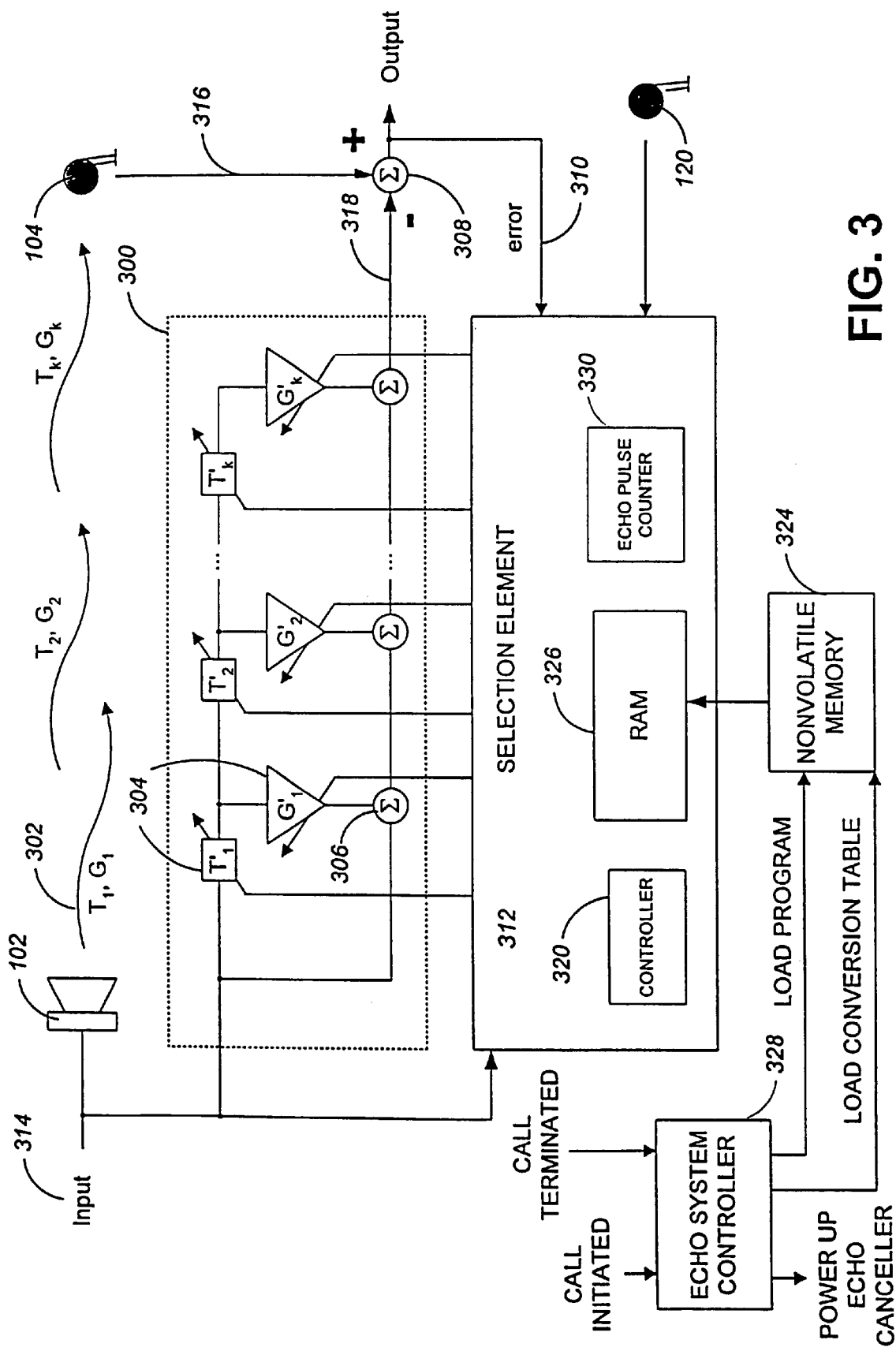
FIG. 3 is a block diagram of the adaptive echo canceller including a transversal filter and a selection element.

FIG. 3 shows a block diagram of the adaptive echo canceller. The echo canceller includes an echo cancelling synthesizer such as a transversal filter 300. It also includes a selection element 312. The transversal filter 300 takes the input signal 314 and synthesizes a replica of the echo. The actual echo 302 with time delay $T_1$ and gain $G_1$ is approximated by the coefficients $T_1'$ and $G_1'$ 304 generated by the selection element 312. The synthesized echo is summed 306 with the input signal 314 and is passed on to the next stage. The total sum 318 is then subtracted 308 from the signal 316 picked up by the microphone 104 which contains the desired voice signal 112 and the unwanted echo signal 302.

The difference between the returned signal 316 picked up by the microphone and the output 318 of the transversal filter results in an error signal 310. The error signal 310 is used by the selection element 312 to iteratively adapt and select time delay and attenuation coefficients 304. Once the set of transversal filter coefficients 304 has been adapted to a particular echo configuration, the error signal 310 at the output should be very close to the desired voice signal 112 with most of the echo 302 canceled out.

All of the components in the transversal filter are implemented with digital parts. The time delays can be implemented with shift registers or memories and the gain amplifiers with digital multiplier circuits. The summations 306 can be implemented with digital adder circuits.

The selection element 312 includes a controller 320, a memory 326, a stack 322 and an echo pulse counter 330. The controller 320, the memory 326 and the stack 322 are powered up with the rest of the echo canceller when the call is initiated.

According to the present system, when the echo canceller is initially powered up, an initial set of transversal filter coefficients is determined using the current ultrasonic delay and attenuation coefficients. A closest set of ultrasonic coefficients to the current coefficients is determined. The transversal filter coefficients corresponding to that closest set is used as an initial set.

The echo pulse counter 330 processes the reflected echo signal 204 picked up by the ultrasound receiver 120 prior to call initiation. The counter 330 records the times 208 when the amplitude of the reflected signal 204 exceeds certain thresholds 206. By sampling several echo signals 204, the counter 330 can determine optimum set of ultrasonic delay and attenuation coefficients for a particular echo configuration within the vehicle cabin 100. Then, the selection element controller correlates the ultrasonic set of coefficients with previously-stored ultrasonic coefficients. The closest previously-stored coefficient set is selected. The audio-frequency coefficient set associated with the closest ultrasonic set is detected.

Figure 4A:
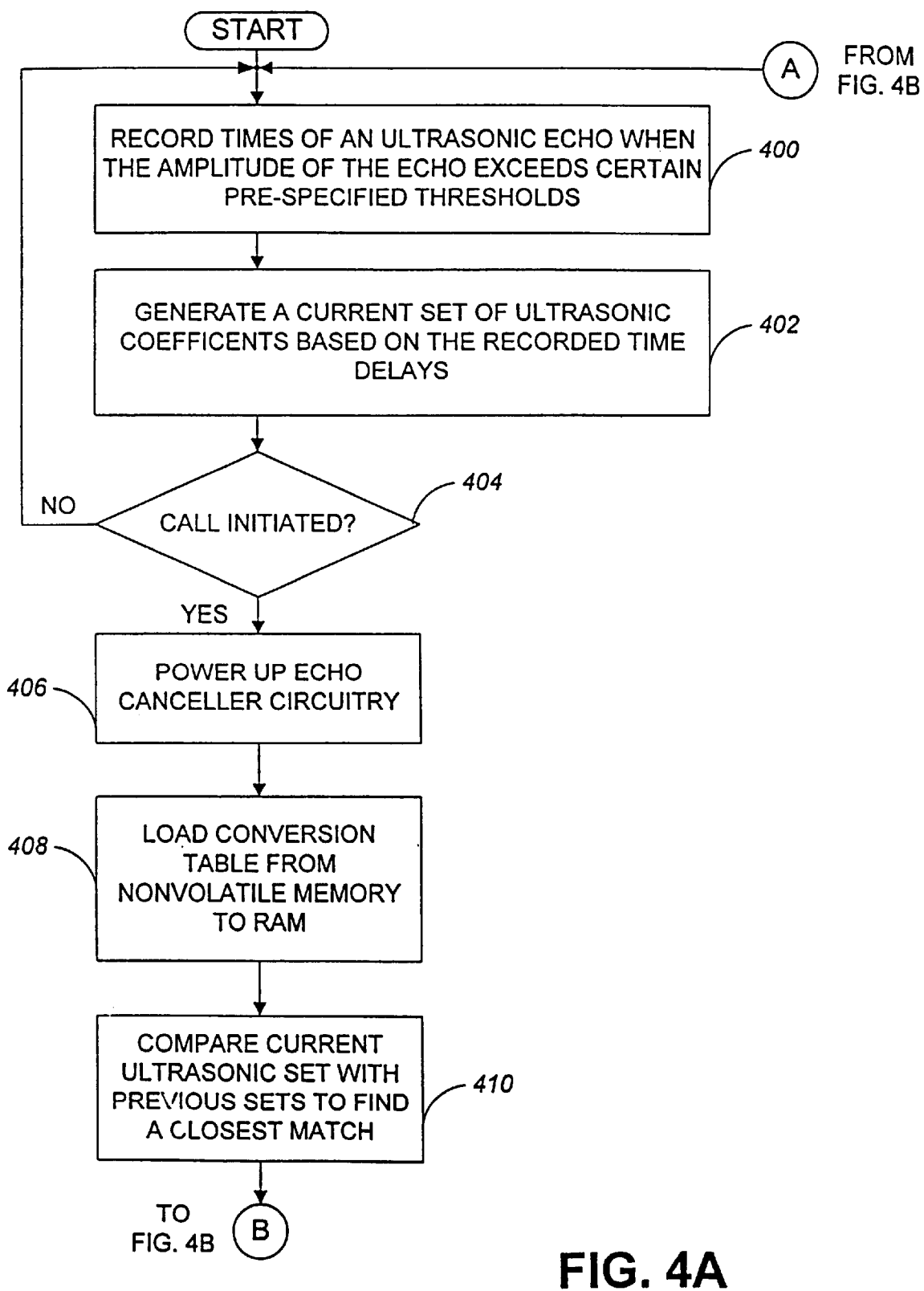
FIGS. 4A and 4B together are a flowchart of the fast-start adaptive control technique.
Figure 4B:
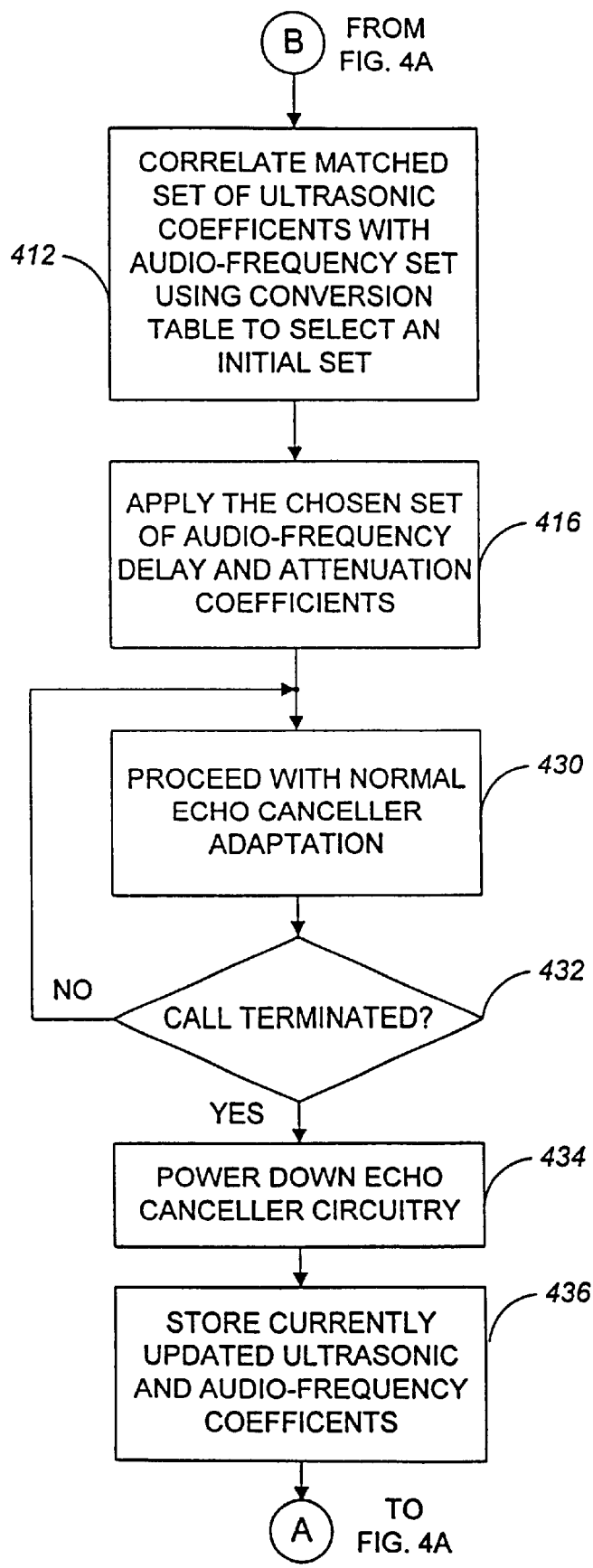

FIGS. 4A and 4B represent a flowchart of a selection element program residing in the memory 326. The ultrasonic echo pulse counter 330 monitors the ultrasound echo signal 204. A closest match with previous sets will be established. First, the counter 330 records times within an ultrasonic echo when the amplitude of the echo exceeds certain pre-specified thresholds at step 400. Next, at step 402, the counter 330 generates set of ultrasonic coefficients based on the times recorded in step 400. These times are used as a current ultrasonic set. The echo system controller 328 monitors the call state of the telephone at step 404. When a call is initiated, the echo system controller 328 powers up the echo canceller circuitry at step 406. The echo system controller 328 loads the previously-established ultrasound-to-audio-frequency coefficient conversion table from the non-volatile memory 324 into the random access memory at step 408.

At step 410, the selection element controller 320 compares the current ultrasonic set with the previous sets to find the closest match. The selection element controller 320 correlates the set of ultrasonic coefficients with the audio-frequency set using the conversion table at step 412 to select the initial audio frequency coefficient set for the echo cancelling synthesizer.

The selection element controller 320 picks at step 414 and applies at step 416 the initial set of audio-frequency coefficients for the echo cancelling synthesizer. This is used in the normal way.

Once the fast-start coefficients have been applied at the beginning of the call, the normal echo canceller adaptation proceeds at step 430 to fine-tune the fast start coefficients and make them more nearly optimal. When the call is terminated at step 432, the echo system controller 328 powers down the echo controller circuitry except for the ultrasonic echo pulse counter 330 at step 434. The currently updated conversion table with ultrasonic and audio-frequency coefficients are stored at step 436. The echo pulse counter 330 continues to run at steps 400 and 402 as long as the phone is turned on.

Advantageous features of the fast-start adaptive control system include flexibility of the algorithm and performance improvement of the echo canceller at the beginning of the call. Since the algorithm is implemented in software, it can be modified to work with environment other than the vehicle speaker phone environment. Also, the ultrasound to audio-frequency conversion table can be easily adjusted to provide optimum coefficients for efficient and fast echo cancellation at start up.

A number of embodiments of the present disclosure have been described. Nevertheless, it will be understood that various modifications may be made without departing from the spirit and scope of the invention. For example, even though the disclosure describes the echo cancellation in terms of acoustic echoes, the same algorithm can be used to fast-start and adapt optimum set of coefficients for echoes created in a telephone circuit. Accordingly, other embodiments are within the scope of the following claims.

What is claimed is:

1. A fast-start adaptive echo canceller for a wireless system comprising:
   at least one speaker for converting an input signal to audible sound;
   at least one microphone for picking up desired voice signal, placed such that said at least one microphone also picks up an echo of said input signal resulting in a combined signal;
   an echo cancelling synthesizer, operating to synthesize a replica of an echo of said input signal based on echo-cancelling coefficients indicative of an environment and to cancel at least a part of said echo of said input signal;
   at least one ultrasonic transceiver for transmitting an ultrasound signal and receiving an echo of said ultrasound signal;
   a nonvolatile memory, storing previously-obtained ultrasonic echoes correlated with echo-cancelling coefficients used; and
   a selection element, said selection element including a controller and a memory, selecting a previously-used set of coefficients based on said ultrasonic echo.

2. A fast-start adaptive echo canceller for a wireless system comprising:
   an echo cancelling synthesizer, operating to synthesize a replica of an echo of a first signal based on echo-cancelling coefficients indicative of an environment and to cancel at least a part of said echo of said first signal;
   at least one ultrasonic transceiver for transmitting an ultrasound signal and receiving an echo of said ultrasound signal;
   a nonvolatile memory, storing previously-obtained ultrasonic echoes correlated with echo-cancelling coefficients used; and
   a selection element, said selection element including a controller and a memory, selecting a previously-used set of coefficients based on said ultrasonic echo.

3. The fast-start echo canceller system of claim 1, wherein said echo cancelling synthesizer is a transversal filter, said transversal filter including stages of adjustable time delays, gain amplifiers and adders configured to synthesize a replica of the echo of the input signal based on applied audio-frequency coefficients.

4. The fast-start echo canceller system of claim 1, further comprising an ultrasonic echo pulse counter, said ultrasonic echo pulse counter operating prior to call initiation to record time delays of said echo of said ultrasound signal when the amplitude of said echo of said ultrasound signal exceeds certain pre-specified thresholds, and generating sets of ultrasonic coefficients based on the recorded time delays.

5. The fast-start echo canceller system of claim 4, further comprising a system controller, said system controller monitoring call initiations and terminations and generating commands, such that said system controller commands said nonvolatile memory to load and store sets of coefficients corresponding to previously-obtained ultrasonic echoes.

6. The fast-start echo canceller system of claim 1, wherein said echo cancelling synthesizer includes a differencing element for taking a difference between said combined signal and an output of said echo cancelling synthesizer resulting in an error signal.

7. The fast-start echo canceller system of claim 2, wherein said echo cancelling synthesizer is a transversal filter, said transversal filter including stages of adjustable time delays, gain amplifiers and adders configured to synthesize a replica of the echo of the first signal based on applied audio-frequency coefficients.

8. The fast-start echo canceller system of claim 2, further comprising an ultrasonic echo pulse counter, said ultrasonic echo pulse counter operating prior to call initiation to record time delays of said echo of said ultrasound signal when the amplitude of said echo of said ultrasound signal exceeds certain pre-specified thresholds, and generating sets of ultrasonic coefficients based on the recorded time delays.

9. The fast-start echo canceller system of claim 8, further comprising a system controller, said system controller monitoring call initiations and terminations and generating commands, such that said system controller commands said nonvolatile memory to load and store sets of coefficients correlating to previously-obtained ultrasonic echoes.

10. A fast-start adaptive echo canceller for a wireless system comprising:
    at least one speaker for converting an input signal to audible sound;
    at least one microphone for picking up desired voice signal, placed such that said at least one microphone also picks up an echo of said input signal resulting in a combined signal;
    an echo cancelling synthesizer, operating to synthesize a replica of an echo of said input signal based on echo-cancelling coefficients indicative of an environment and to cancel at least a part of said echo of said input signal;

at least one ultrasonic transceiver for transmitting an ultrasound signal and receiving an echo of said ultrasound signal;

a non-volatile memory, storing previously-obtained ultrasonic echoes correlated with echo-cancelling coefficients used;

a selection element, said selection element including a controller and a memory, selecting a previously-used set of coefficeints based on said ultrasonic echo;

an ultrasonic echo pulse counter, said ultrasonic echo pulse counter operating prior to call initiation to record time delays of said echo of said ultrasound signal when the amplitude of the said echo of said ultrasound signal exceeds certain pre-specified thresholds, and generating set of ultrasonic coefficients based on the recorded time delays; and a system controller, said system controller monitoring call initiations and terminations and generating commands, such that said system controller commands said non-volatile memory to load and store sets of coefficients correlating to previously-obtained ultrasonic echoes.

11. A fast-start adaptive echo canceller for a wireless system comprising:

an echo cancelling synthesizer, operating to synthesize a replica of an echo of a first signal based on echo-cancelling coefficients indicative of an environment and to cancel at least a part of said echo of said first signal;

at least one ultrasonic transceiver for transmitting an ultrasound signal and receiving an echo of said ultrasound signal;

a nonvolatile memory, storing previously-obtained ultrasonic echoes correlated with echo-cancelling coefficients used;

a selection element, said selection element including a controller and a memory, selecting a previously-used set of coefficeints based on said ultrasonic echo;

an ultrasonic echo pulse counter, said ultrasonic echo pulse counter operating prior to call initiation to record time delays of said echo of said ultrasound signal when the amplitude of the said echo of said ultrasound signal exceeds certain pre-specified thresholds, and generating set of ultrasonic coefficients based on the recorded time delays; and a system controller, said system controller monitoring call initiations and terminations and generating commands, such that said system controller commands said non-volatile memory to load and store sets of coefficients correlating to previously-obtained ultrasonic echoes.

12. A method for quickly starting an echo canceller for a wireless system comprising:

recording times of an echo of an ultrasound signal when the amplitude of said echo of said ultrasound signal exceeds certain pre-specified thresholds;

generating a current set of ultrasonic coefficients based on the recorded time delays of said echo of said ultrasound signal;

comparing said current set of ultrasonic coefficients with previous sets to find the closest match;

correlating said matched set of ultrasonic coefficients with set of audio-frequency coefficients using a predetermined ultrasonic to audio-frequency conversion table;

applying an initial set of audio-frequency coefficients from said audio-frequency sets in said memory; and starting a normal adaptation process of iteratively synthesizing an echo and subtracting said synthesized echo from a combined signal of desired voice and audio input signal based on a previous difference.

* * * * *